United States Patent Office 3,258,326
Patented June 28, 1966

3,258,326
STABLE AQUEOUS SUSPENSIONS OF PESTICIDALLY ACTIVE SOLIDS ADAPTED TO BE DISPENSED FROM AEROSOL CONTAINERS
Bernard Rabussier, Poitiers, France, assignor to Societe Poitevine de Conditionnement, Paris, France
No Drawing. Filed July 22, 1963, Ser. No. 296,495
Claims priority, application France, Aug. 3, 1962, 905,980
14 Claims. (Cl. 71—2.5)

This invention is concerned with stable suspensions in aqueous medium and the method of preparing the same. More specifically, this invention relates, as a novel composition of matter, to anti-parasitic compositions (this term including insecticides, fungicides and rodenticides) and to herbicide compositions. Compositions of this kind which will be hereinafter referred to generically as "pesticidally active compositions," comprise a solid phase in suspension in an aqueous medium, the solid phase generally constituting the active agent of the composition. This invention relates also to the method of preparing said pesticidally active compositions.

The pesticidally active compositions according to the invention are remarkable by the stability of the suspension, the latter having a substantially indefinite storage life.

The compositions according to the invention are also distinguished in that they can be used for aerosols, thus enabling the active product to be distributed by spraying from containers.

To suspend solid particles in water it is known that a surface-active agent must be added to said particles so as to reduce the surface tension of the water.

It is also known that the stability of the suspension is improved by the addition of hydrophilic colloids to the water, such hydrophilic colloids given pseudo-aqueous solutions and increasing the viscosity of the medium, such increase depending upon the nature of such colloids and their concentration. It has already been proposed to add to the water either colloids of a natural origin, such as agar-agar, gum arabic, gum tragacanth, pectin, dextrin, alginates, carragheenates, or synthetic collides such as carboxymethyl celluloses, methyl celluloses, hydroxyethyl celluloses, polyvinyl alcohols, or carboxyvinyl polymers (carbopols).

The above two methods of stabilization, although associated, have the disadvantage that they do not enable the suspension to be stored indefinitely without giving the suspension a very high viscosity, and this greatly limits its possible uses.

It is therefore an object of the instant invention to obviate these disadvantages and to yield suspensions of hydrophobic particles in an aqueous medium of a practically indefinite life.

Another object of the invention is to enable the manufacture of stable suspensions of solid particles in an aqueous medium adapted to be stored in an aerosol container and to be very easily dispensed by means of a pushbutton valve without risk of choking the valve.

These and further objects of the invention will be made apparent when the specification proceeds.

Numerous insecticide compositions have already been proposed, comprising dichlorodiphenyltrichloroethane (DDT) as active agent, the latter constituting a hydrophobic solid. These known compositions also contain in aqueous phase a surface-active agent and a hydrocarbon. Such quaternary mixtures have the disadvantages of inadequate stability. The suspension settles after a certain time so that such suspensions cannot be used for aerosol containers.

Insecticide compositions are also known in which the active agent in suspension is the ammonium salt of dinitro-orthocresol, which is a hydrophilic solid.

Such compositions also contain an aqueous phase a hydrocarbon whose boiling point is between 150 and 450° C., an emulsifier (non-ionic surface-active agent) and a peptizing agent for the active solid, said agent being dodecylamine.

A composition of this kind, however, is intended particularly for the use of an ammonium salt of dinitro-orthocresol. If other active agents such as DDT are added to the latter the stability of the suspension is lost.

On the other hand, the quinary (or higher) mixtures forming the subject of this invention have the character of specific associations, whose constituents satisfy well-defined conditions. Such compositions particularly enable suspensions of solid particles in an aqueous medium to be obtained with a practically indefinite stability in aerosol-type containers.

According to the present invention, the pesticidally active composition (anti-parasitic or herbicide) is characterised in that it contains in combination the followng ingredients in an aqueous medium:

A pesticidally active ingredient consisting of solid and hydrophobic particles of size less than 50 microns.

A hydrophilic colloid (soluble in cold water) derived from a polyoside or a polyosane, which colloid is referred to in the appended claims as "hydrophilic polysaccharide colloide soluble in cold water."

A surface-active agent in the form of a mono-ester or poly-ester of a fatty acid and a polyol, liquid at ordinary temperature and giving an emulsion of the "water-in-oil" type.

A hydrocarbon containing 3 to 15 atoms of carbon.

Experiments have given the surprising result that compositions satisfying the above conditions have perfect stability. More particularly, the association of the hydrophilic colloid, the surface-active agent and the hydrocarbon enable the suspension of particles of the hydrophobic solid in the aqueous medium to be partically completely stabilized.

The field of application of the invention and its conditions of use will now be indicated.

By the expression "hydrophobic solid materials" the invention covers ordinary solid metalloid substances and solid organic compound substances which do not react chemically with water, which are insoluble in water and which are not wetted by pure water.

According to a first embodiment of the invention, the hydrophobic solid particles constitute the active agent of the composition.

More particularly, the invention proposes the use of the following synthetised active anti-parasitic and herbicidal substances, which are solid and which all have a hydrophobic character:

Sulphur
Hexachlorobenzene
Zinc dimethyldithiocarbamate (ziram)
Bis-(dimethylthiocarbamoyl) disulphide (thiram or TMTD)
Dimethyldithiocarbamoylcarbinol benzoate
2,2'-dihydroxy 5,5'-dichloro-diphenylmethane (dichlorophene)
Thiocyanodinitrobenzene
Industrial 1,2,3,4,5,6-hexachlorocyclohexane or its pure gamma stereo-isomer
1,1,1-trichloro 2,2-bis-(p-chlorophenyl)-ethane (DDT)
1,1,1-trichloro 2,2-bis-(p-methoxyphenyl)-ethane (methoxychlor)
Paradichlorobenzene
Phenothiazine
1-naphthyl N-methylcarbamate (sevin)

1,2,3,4,10,10-hexachloro-6,7-epoxy-1,4,4a,5,6,7,8,8a-
    octahydro-1,4,-endo-exo-5,8-dimethanonaphthalene
    (dieldrin)
1,2,3,4,10,10-hexachloro-6,7-epoxy-1,4,4a,5,6,7,8,8a-
    octahydro-1,4,5,8-endo-endo-dimethanonaphthalene
    (endrin)
1,2,3,4,10,10-hexachloro-1,4,4a,5,8,8a-hexahydro-1,4,5,
    8-endo-exo-dimethanonapthalene (aldrin)
2-chloro-4,6-bis (ethylamino)-1,3,5-triazine (simazin)
2-chloro-4-ethylamino-6-isopropylamino-1,3,5-triazine
    (atrazin)

On the other hand, the solid pesticidal substances belonging to the following categories are outside the direct field of application of the invention:

Water-insoluble inorganic compounds, for example copper oxychloride,
Organic pulverulent hydrophobic compounds whose solubility in liquid hydrocarbon is such that they are completely dissolved into the organic phase,
Organic compounds insoluble in water but wetted by pure water, for example maleic hydrazine, zinc ethylene-bis-dithiocarbamate (zineb) and the ammonium salt of dinitroorthocresol.

According to another embodiment of the invention, the hydrophobic solid does not play an active part by itself, but constitutes an adjuvant for indirect stabilization of solid particles of an active hydrophilic material by the association of particles of both categories (hydrophilic and hydrophobic) in the same composition.

By way of example, the following hydrophobic solids give a stable suspension and may be used as a stabilization ingredient for hydrophilic particles:

Aluminum,
Calcium stearate,
Magnesium stearate,
Zinc stearate,
Hexachloroethane,
Rouge Lutecia solid 3R powder,
Cyanine Lutecia solid NCB powder.

By way of example of hydrophilic particles usable for the above purpose as active agents, copper oxychloride and zinc ethylene-bis-dithiocarbamate may be mentioned in particular.

The same hydrophobic material may of course act both as the active agent and as an adjuvant for stabilization of the active hydrophilic substance.

In the above-mentioned second embodiment, the hydrophobic substance essential to the total stabilization effect may either be another active pesticidally substance in the case of a mixed composition or a stabilization ingredient in the same capacity as the surface-active agent, the hydrophilic colloid and the liquid hydrocarbon.

Preferably, the size of the particles of hydrophobic solid material is less than 50 microns; excellent results have been obtained with pulverulent products whose particle size has been reduced to between 5 and 20 microns, such particles hereinafter being referred to as "micronized." There is no bottom limit for the particle size.

The aqueous suspension of the said particles also receives one or more colloids soluble in cold water, such colloids being derivatives of a polyoside or a polyosane and selected, for example, from the following natural synthetic agents:

Agar-agar,
Gum arabic,
Gum tragacanth,
An alginate,
A carragheenate,
A sodium celluloseglycolate (carboxymethylcellulose),
A hydroxyethylcellulose.

The surface-active agent used must be a monoester or a polyester of a fatty acid and a polyol, liquid at ambient room temperature, and with a HLB (hydrophile-lipophile-balance) number less than 9 and greater than or equal to:

4 in the case of a monoester,
3 in the case of a diester,
2 in the case of a triester.

Since the HLB number cannot be determined exactly, the limits indicated may vary within tolerances of ±0.5.

The selection of the surface-active agent in the HLB range depends on the nature of the solid particles to be kept in suspension. The following may be mentioned as particular agents:

Sorbitan monolaurate $(C_6H_8(OH)_3(OCOC_{11}H_{23}))$

Sorbitan monooleate $$(C_6H_8(OH)_3OCO-(CH_2)_7-CH=CH-C_8H_{17})$$

Sorbitan dioleate $$(C_6H_8O(OH)_2[OCO-(CH_2)_7-CH=CH-C_8H_{17}]_2)$$

Sorbitan trioleate $$(C_6H_8(OH)[OCO-(CH_2)_7-CH=CH-C_8H_{17}]_3)$$

Diethylene glycol monooleate $$(OH-CH_2-CH_2-O-CH_2-CH_2-O-CO-(CH_2)_7-CH=CH-C_8H_{17})$$

Glycerol monoricinoleate $$CH_3-(CH_2)_5CH-CH_2-CH=CH-(CH_2)_7-CO-O-CH_2-CH-CH_2OH$$
$$\quad\quad\quad\quad\quad\ |\quad\quad\quad\quad\quad\quad\quad\quad\quad\quad\quad\quad\quad\quad\quad\quad\quad |$$
$$\quad\quad\quad\quad\quad OH\quad\quad\quad\quad\quad\quad\quad\quad\quad\quad\quad\quad\quad\quad\quad\quad OH$$

Polyethyleneglycol 400 di-tri-ricinoleate (saponification number 160–170).

The hydrocarbon, like the hydrophilic colloid, plays an essential part in stabilizing the suspension of solid particles.

Where the composition is required to be stored in ordinary containers, the hydrocarbon acts only as a stabilizer.

In such cases, it is possible to use a hydrocarbon liquid (or liquefied) at room temperature which may primarily belong to the group of linear or branched saturated or unsaturated aliphatic or alicyclic hydrocarbons containing 3 to 15 atoms of carbon, such as the following for example:

| | |
|---|---|
| Pentene | Octene |
| Normal hexane | 2,2,4-trimethyl pentane |
| Cyclohexane | Normal nonane |
| Cyclohexene | Normal decane |
| Methylcyclohexane | The kerosenes |
| 2,3-dimethyl 1,3-butadiene | Vaseline oils |
| Normal heptane | Alpha-pinene |
| Cycloheptane | Dipentene |
| Normal octane | |

The following aromatic hydrocarbons may also be used in second place:

| | |
|---|---|
| Benzene | Trimethylbenzenes |
| Toluene | Methylisopropylbenzenes |
| Xylenes | Diisopropylbenzenes |
| Ethylbenzene | Methylnaphthalene |

When the composition is packed as an aerosol, the hydrocarbon is preferably wholly or partially formed by one or more hydrocarbons in the liquid state under pressure at ambient temperature, for example propane, normal butane, isobutane, isobutylene, normal pentane, propylene, 1-butene and 2-butene. Such a hydrocarbon then performs the double role as a stabilizer according to the invention and an aerosol propellant.

It is also possible to prepare aerosol compositions according to the invention wherein the stabilizer and the propellant are completely separate. This is the case when the stabilizer is a hydrocarbon in the liquid state under atmospheric pressure and room temperature and the propellant is a liquid gas belonging to a chemical category other than the hydrocarbons, for example the chloro or chlorofluoro derivatives of methane and ethane. Preparations of this kind, however, are more expensive.

Although the proportions of the various agents proposed by the invention are not critical, they may be specified as follows:

The solid content is the suspension is preferably between 0.2 and 25% of the weight of the final composition.

With regard to the surface-active agent, the quantity depends on the nature and, in particular, the dimensions of the hydrophobic solid particles. In the case of particles having a mean diameter of 10 microns, the surface-active agent content is advantageously in the range of one-tenth or even one-twentieth of the powder content, while in the case of a mean diameter of 0.01 micron it is preferably in the range of twice the powder content.

The hydrophilic colloid content of the composition depends on its thickening power. This content is so determined that the viscosity of the colloidal solution (colloid dissolved in all the water of the composition) is preferably between 1.5 and 6 centipoises.

The liquid hydrocarbon content required to give the particle stabilization effect (excluding any amount required as propellant) is given approximately by the following equation:

$$h = 5 + 2.5 \log P \qquad (1)$$

$h$ being the weight in grams of liquid hydrocarbon in the final composition, P being the weight in grams of hydrophobic powder in the final composition.

Formula 1 gives a liquid hydrocarbon content in the region of 4% for powder concentrations less than 2%. This optimum content then increases with an increase in the powder content. It is in the region of 10% in the case of a 20% concentration of solid particles.

Where the composition is packed as an aerosol, the amount of liquid gas required for the operation of the aerosol system must be added to this quantity of liquid hydrocarbon required for stabilization. The amount is determined experimentally and depends on the nature of the liquid gas used, on the viscosity of the composition to be distributed, the dispersion required (jet, coarse drops, fine drops) and the type of valve used.

The stabilized suspensions according to this invention may have a very appreciable viscosity.

This is due to the fact that the volume of the continuous phase is approximately 5 to 20 times less than that of the dispersed phase, but although this considerable increase in viscosity contributes towards stabilization of the suspension in accordance with Stokes' law it is not alone responsible for the stabilization effect. For an equal viscosity an ordinary suspension having a high thickener content has a stability much below that of a stabilized suspension according to the invention, as will be seen from the following comparative example:

|  | (a) | (b) |
|---|---|---|
|  | Percent | Percent |
| Micronized sulphur | 1.8 | 1.8 |
| Sorbitan monooleate | 0.15 | 0.15 |
| Very highly viscous carboxymethylcellulose | 1.5 | 0.2 |
| Fresh water | 96.55 | 87.85 |
| Hexane |  | 10 |

These two preparations have substantially the same viscosity of about 1,000 centipoises at 20° C. If these suspensions are left to stand, it will be found that in preparation (a) the sulphur settles at the end of about 24 hours, while the sulphur in preparation (b) is still in homogeneous suspension at the end of 3 months. If the suspensions are subjected to high-speed centrifugation, the sulphur separates instantaneously in (a) but is still in suspension at the end of an hour in the case of (b).

The invention has an advantageous application to the problem of preparing aerosols from aqueous products containing fine particles of hydrophobic substances in suspension. The invention enables suspensions of practically unlimited stability to be obtained in the aerosol container, thus giving the composition the following two basic advantages:

Homogeneous composition of the distributed product without the need for any agitation, Elimination of any risk of valve blockage, such blockage being due to the instantaneous passage of a too large quantity of solid particles.

If the stabilizer hydrocarbon is also the propellant, the invention enables compositions to be obtained which can be used in an aerosol packing and which are distinguished in that they have a viscosity which may be high in the container under pressure while being readily sprayable in fine droplets when delivered through a valve of the kind used for aerosol containers.

The vaporization of the hydrocarbon in fact eliminates the stabilization effect at the valve outlet and there is an abrupt reduction of viscosity of the liquid stream which is then readily divided into fine droplets.

By way of comparison, if an aerosol is prepared from an aqueous suspension of solid particles propelled with butane or isobutane and whose composition does not satisfy the specifications of the invention as regards the surface-active agent or the hydrophilic colloid, and if use is made of a composition containing a high proportion of thickener in order to maintain a powder in suspension by gelification of the composition, it is impossible to spray the composition through an aerosol valve. At the most a liquid stream is obtained whose viscosity opposes any division of the stream into droplets despite the combined effect of the valve mechanism and of the expansion of the propellant.

Various examples of compositions according to the invention are given below.

A first embodiment is a sulphur-based horticultural anti-parasitic preparation intended for the treatment of speckles and oidium on fruit trees, the preparation being ready for use in the form of an aerosol container. The sulphur cannot be solubilized in one of its known solvents (particularly carbon disulphide) for reasons associated with toxicity and phytotoxicity; the sulphur may only be in suspension and preferably in water. Moreover, since the required method of distribution comprises a valve mechanism with relatively narrow apertures and since systematic agitation of an aerosol container by the user is uncertain, the solid particles must be prevented from settling to ensure emptying of the container without any risk of blockage. The compositions according to the invention enable this condition to be satisfied.

The following formula is a numerical example of such a very stable fungicidal preparation:

EXAMPLE 1

|  | Percent |
|---|---|
| Micronized sulphur | 1.5 |
| Sorbitan monooleate | 0.2 |
| Petroleum ether | 1 |
| Agar-agar | 0.05 |
| Fresh water | 77.25 |
| Industrial butane | 20 |

Numerous horticultural pesticidal compositions may be prepared similarly and with the same technical advantages as in the preparation according to Example 1, such compositions being ready for use in an aerosol container and containing the active hydrophobic and pulverulant material or materials as very stable suspensions. The following compositions are numerical examples selected from a large number of possible combinations of hydrophobic powders, soluble colloids, surface-active agents, hydrocarbons and, if desired, other active ingredients for the applications in question. Especially the compositions may also comprise hydrophilic active materials e.g. copper oxychloride, the suspension thereof being stabilized by the combination of the other components.

EXAMPLE 2

Product for treatment of fruit tree speckles:

| | Percent |
|---|---|
| Micronized sulphur | 0.8 |
| Copper oxychloride | 0.5 |
| Very high viscosity CMC (Blanose R190) | 0.2 |
| Kerosene | 1 |
| Sorbitan monolaurate | 0.1 |
| Sorbitan monooleate | 0.1 |
| Fresh water | 77.3 |
| Industrial butane | 20 |

EXAMPLE 3

Mixed fungicidal and insecticidal product for the treatment of speckles and weevils on apple and pear trees

| | Percent |
|---|---|
| Micronized sulphur | 1 |
| Micronized ziram | 0.4 |
| Micronized lindane | 0.3 |
| Hydroxyethylcellulose (25,000 cps. (Natrosol 250H) | 0.1 |
| Hexane | 1 |
| Sorbitan monooleate | 0.08 |
| Sorbitan dioleate | 0.08 |
| Fresh water | 79.04 |
| Industrial butane | 18 |

EXAMPLE 4

Polyvalent product for garden plants (rose bushes, flowering shrubs, etc.):

| | Percent |
|---|---|
| Micronized sulphur | 1.2 |
| Micronized thiram | 0.5 |
| Micronized lindane | 0.2 |
| 20% rotenone | 0.5 |
| Alginate | 0.2 |
| Fluid Vaseline oil | 1 |
| Sorbitan monolaurate | 0.3 |
| Fresh water | 74.1 |
| Industrial butane | 22 |

EXAMPLE 5

Polyvalent product for the same use as Example 4:

| | Percent |
|---|---|
| Micronized sulphur | 2 |
| Micronized thiram | 0.4 |
| Micronized lindane | 0.05 |
| Dimetan | 0.05 |
| Very high ciscosity CMC (Blanose R190) | 0.2 |
| Petroleum ether | 1 |
| Diethylene glycol monooleate | 0.2 |
| Fresh water | 76.1 |
| Industrial butane | 20 |

EXAMPLE 6

Polyvalent fungicide, insecticide and reviver for garden plants:

| | Percent |
|---|---|
| Micronized sulphur | 0.6 |
| Micronized ziram | 0.7 |
| Micronized DDT | 0.3 |
| Dimetan | 0.1 |
| Acetone | 0.1 |
| 20% pyrethrins | 0.15 |
| Industrial urea | 0.43 |
| Carragheenate (Viscarine L) | 0.2 |
| Petroleum ether | 1 |
| Sorbitan monooleate | 0.2 |
| Fresh water | 76.22 |
| Industrial butane | 20 |

EXAMPLE 7

Mixed product for the treatment of fruit trees:

| | Percent |
|---|---|
| Micronized ziram | 0.4 |
| Micronized lindane | 0.1 |
| Dimetan | 0.07 |
| Hydroxyethylcellulose (Cellosize QP 15,000) | 0.1 |
| Low-boiling gasoline B | 1 |
| Polyethylene glycol 400 di-tri-ricinoleate | 0.25 |
| Fresh water | 73.08 |
| Industrial butane | 25 |

EXAMPLE 8

Product for the treatment of speckles on fruit trees:

| | Percent |
|---|---|
| Micronized zineb | 0.6 |
| Calcium stearate | 0.5 |
| Hydroxyethylcellulose 25,000 cps. (Natrosol 250H) | 0.1 |
| Petroleum ether | 1 |
| Sorbitan monolaurate | 0.1 |
| Sorbitan monooleate | 0.05 |
| Sorbitan dioleate | 0.05 |
| Fresh water | 77.6 |
| Industrial butane | 20 |

EXAMPLE 9

Product for the treatment of apple and pear tree weevils:

| | Percent |
|---|---|
| Micronized lindane | 0.8 |
| Carragheenate (Viscarine L) | 0.2 |
| Petroleum ether | 1 |
| Sorbitan monooleate | 0.2 |
| Fresh water | 77.8 |
| Industrial butane | 20 |

EXAMPLE 10

Product for the control of grape worm on vines:

| | Percent |
|---|---|
| Micronized sevin | 0.4 |
| Sorbitan monooleate | 0.1 |
| Very high viscosity CMC (Blanose R190) | 0.2 |
| Normal pentane | 1 |
| Fresh water | 86.3 |
| Industrial butane | 12 |

In Examples 1 to 10, the industrial liquid butane (a mixture of normal butane, isobutane and propane) performs the double role of stabilizer for the suspension and a propellant gas for the distribution. The composition contains an excess of hydrocarbon in relation to optimum amount necessary to the stabilization, this excess being directly admitted in vapour phase into the valve during its opening in order to improve spraying. The excess hydrocarbon vaporizes completely during emptying of the aerosol contaner without affecting the suspension of soild particles. The part or parts played by each of the constituents in Examples 1 to 10 are shown in Table I. In this table, the effects of each constituent are denoted by the following symbols:

A—active agent in the composition
C—soluble stabilizer colloid
H—stabilizer hydrocarbon
P—propellant
S—hydrophobic powder
T—surface-active stabilizer
Z—various ingredients.

Table I

| Constituents | \multicolumn{10}{c}{Examples} |
|---|---|---|---|---|---|---|---|---|---|---|
| | 1 | 2 | 3 | 4 | 5 | 6 | 7 | 8 | 9 | 10 |
| Sulphur | SA | SA | SA | SA | SA | | | | | |
| Copper oxychloride | | A | | | | | | | | |
| Ziram | | | SA | | | SA | SA | | | |
| Lindane | | | SA | SA | SA | | SA | | SA | |
| Thiram | | | | SA | SA | | | | | |
| Rotenone | | | | A | A | | | | | |
| Dimetan | | | | | A | A | A | | | |
| DDT | | | | | | SA | | | | |
| Pyrethrins | | | | | | A | | | | |
| Urea | | | | | | A | | | | |
| Zineb | | | | | | | | A | | |
| Sevin | | | | | | | | | | SA |
| Calcium stearate | | | | | | | | S | | |
| Acetone | | | | | | Z | | | | |
| Agar-agar | C | | | | | | | | | |
| CMC | | C | | | C | | | | | C |
| Hydroxyethylcellulose | | | C | | | | C | C | | |
| Alginate | | | | C | | | | | | |
| Carragheenate | | | | | | C | | | C | |
| Sorbitan monooleate | T | T | T | | | T | | T | T | T |
| Sorbitan monolaurate | | T | | T | | | | T | | |
| Sorbitan dioleate | | | T | | | | | T | | |
| Diethyleneglycol monooleate | | | | | T | | | | | |
| PEG 400 di-tri-ricinoleate | | | | | | | T | | | |
| Petroleum ether | H | | | | H | H | | H | H | |
| Hexane | | | | H | | | | | | |
| Pentane | | | | | | | | | | H |
| Low boiling gasoline | | | | | | | H | | | |
| Fluid Vaseline oil | | | | | H | | | | | |
| Kerosene | | H | | | | | | | | |
| Industrial butane | HP | HP | HP | HP | HP | HP | HP | HP | HP | HP |

Table I shows that according to another feature of the invention the outstanding stabilization effect thus obtained is also used to stabilize aqueous suspensions of active hydrophilic solid particles, as in the case of copper oxychloride in Example 2 and zineb in Example 8.

To this end, there are added to the hydrophilic particles constituting the active product, the various stabilization agents explained hereinbefore, including hydrophobic particles which may either be another active agent in the composition (as in the case of sulphur in Example 2), or simply an inert stabilization ingredient (as in the case of calcium stearate in Example 8).

All the solid particles are then stabilized although only a part is formed by a hydrophobic material. The maximum content of hydrophilic powder for a given content of hydrophobic powder depends on the respective hydrophilic and hydrophobic nature of the two powders. In order to prevent disruption of the suspension stability, the hydrophilic powder content used in practice is very much below the maximum admissible content.

Table I also shows that the Examples 1 to 10 all contain two stabilizer hydrocarbons. One is a liquid gas under pressure (butane), the other a liquid under normal temperature and pressure conditions (petroleum ether, kerosene, etc.).

The two hydrocarbons do not necessarily have to be present to give a stable suspension in the final formula, and the industrial butane alone would be sufficient to stabilize the powders in Examples 1 to 10. In these examples, the function of the hydrocarbon liquid under pressure and ambient temperature is to permit the intermediate preparation of a stable concentrated composition in order to facilitate industrial filling of the aerosol containers and reduce the agitation required for stabilization in a closed container.

This intermediate preparation is a particular case of the stabilization process according to the invention.

For the preparation of a stable suspension of solid particles in an aerosol container the preferred process according to the invention is as follows.

(a) Preparation of an intermediate concentrated suspension:

The hydrophilic colloid to be dissolved is introduced into a quantity of water such that the viscosity of the resultant concentrated solution is from 200 to 1,000 centipoises.

The surface-active agent is dissolved in the hydrocarbon liquid under atmospheric pressure and room temperature. The weight of this hydrocarbon represents approximately 5% of the weight of said intermediate concentrated suspension.

The hydrophobic powder is introduced into a mixer, wetted with the liquid hydrocarbon containing the surface-active agent, and then formed into a paste with the aqueous solution of the hydrophilic colloid.

Any other ingredients in the composition are then added, mixing being continued.

The aqueous suspension thus obtained is very viscous and highly stable.

(b) Aerosol packing:

The required amount of concentrated suspension obtained under (a) is introduced into each aerosol container. In view of the high viscosity of the stable concentrate, it is advantageous to use a paste dispensing machine for this operation.

The amount of water required to make up the amount of the final composition is added.

The aerosol valve is fitted.

The hydrocarbon propellant is introduced under pressure through the valve.

If the nature and amount of soluble colloid and surface-active agent in the composition are appropriately chosen, the manual or automatic operations of inspection, packing and transport for the product are sufficient to give a stable dilute suspension in the aerosol container without the use of any specific agitation with the use of a vibratory table for example.

The above-described process may be carried out in various ways without departing from the scope of the invention to solve certain special problems in respect of formula or packing. For example, stabilization of the intermediate concentrate may always be dispensed with if, for example, the resultant viscosity increase has disadvantages or if the presence of a hydrocarbon other than the propellant is a disadvantage in the final composition.

Other embodiments of the invention relate to pesticides comprising herbicides comprising one or more active substances in the form of fine hydrophobic particles, such as, for example, simazin or atrazin, the pesticide being packed in an aerosol container. This permits the distribution of a dose for dilution in water for the treatment of a given surface. Simazin and atrazin, which are difficulty solublizable triazines, cannot be economically used in the form of a solution. For aerosol distribution, therefore, simazin or atrazin have to be suspended, preferably in water. Since in addition the attempt is made to have constant quantities of active material by means of a valve giving a volumetric dose, it is desirable to have a homogeneous suspension. Also, settling must be avoided as indicated hereinbefore for pesticidal preparations in the form of antiparasitic preparations owing to the risk of blockage of the valve.

The following four formulae for a pesticide in the nature of a herbicide satisfying the above conditions are given by way of numerical examples:

EXAMPLE 11

| | Percent |
|---|---|
| Simazin | 10 |
| Atrazin | 2 |
| Agar-agar | 0.05 |
| Sorbitan monooleate | 0.6 |
| Sorbitan monolaurate | 0.6 |
| Fresh water | 79.75 |
| Isobutane | 7 |

EXAMPLE 12

| | |
|---|---|
| Atrasin | 15 |
| Very high viscosity CMC (Blanose R190) | 0.1 |
| Hydroxyethylcellulose (Cellosize WP 15,000) | 0.1 |
| Sorbitan monooleate | 1.5 |
| Fresh water | 73.3 |
| Industrial butane | 10 |

EXAMPLE 13

| | |
|---|---|
| Atrazin | 20 |
| Very high viscosity CMC (Blanose R190) | 0.3 |
| Sorbitan monooleate | 2 |
| Fresh water | 62.7 |
| Industrial butane | 15 |

EXAMPLE 14

| | |
|---|---|
| Simazin | 21 |
| Agar-agar | 0.06 |
| Sorbitan monolaurate | 2.1 |
| Fresh water | 61.84 |
| Industrial butane | 15 |

The action or actions of each of the constituents in Examples 11 to 14 are given in Table II, the same symbols being used as in Table I.

*Table II*

| Constituents | Examples | | | |
|---|---|---|---|---|
| | 11 | 12 | 13 | 14 |
| Simazin | SA | | | SA |
| Atrazin | SA | SA | SA | |
| Agar-agar | C | | | C |
| CMC | | C | C | |
| Hydroxyethylcellulose | | C | | |
| Sorbitan monooleate | T | T | T | |
| Sorbitan monolaurate | T | | | T |
| Isobutane | HP | | | |
| Industrial butane | | HP | HP | HP |

The stabilized aerosol preparations in Examples 11 to 14 are not intended for the spraying of a surface to be treated, but for dispersion in water, so that the valve selected does not have an inlet for propellent gas, unlike the valves chosen for Examples 1 to 10. As a result, the product in compositions 11 to 14 can be ejected with just a very slight excess of hydrocarbon in relation to the optimum quantity required just for stabilization.

For utilization, a metering valve enables a constant volume of stable suspension to be distributed. This concentrated suspension is ejected in the form of a jet into the treatment sprinkler or sprayer containing the water required for dilution of the dose. Since the stabilized composition is an emulsion of the water-in-oil type the emulsion must be broken to enable the suspension in water to be dispersed.

In the example under consideration, the emulsion breaks naturally, since immediately it leaves the aerosol container the concentrated suspension loses its hydrocarbon by vaporization, becomes an ordinary non-stabilized suspension once again and can then disperse in the water.

The pesticidal formulae in Examples 11 to 14 differ essentially from the compositions in Examples 1 to 10 in that they have a much greater hydrophobic powder content and in that there is no hydrocarbon liquid under atmospheric pressure and room temperature. As a result, the preferred process of the invention for the preparation of stable suspensions of this type in an aerosol container is slightly different from that indicated in Examples 1 to 10. This process is as follows.

(a) Preparation of an unstable suspension:

The hydrophilic colloid to be dissolved is introduced into all the water,

The surface active agent is dispersed into the hydrophilic colloid solution thus obtained, The hydrophobic solid particles are impasted in a mixer with the aqueous solution above prepared containing the hydrophilic colloid having the surface active agent dissolved therein.

(b) Packing as an aerosol with correlative stabilization:

The required dose of suspension obtained under (a) is introduced into each aerosol container, The aerosol valve is fitted, The propellant hydrocarbon is introduced under pressure through the valve.

If the nature and quantity of soluble colloid and surface-active agent in the composition are appropriately selected, the handling of the full aerosol containers is sufficient to produce a stable composition without the application of any specific agitation.

Other embodiments of the invention relate to an aqueous pesticide comprising an insecticide in aerosol form for the treatment of various surfaces in dwellings. In comparison with conventional aerosol formulae for the same use, these compositions not only have the same advantages but also additional advantages due to the elimination of the organic solvents (reduced cost, absence of any smell, reduction of toxicity, and the absence of any dissolution power in respect of the treated surfaces, etc.).

The following formulae are numerical examples of such pesticides in the form of insecticide compositions, in which one or more active materials are in the form of fine solid particles in stable suspension in an aqueous medium. When the aerosol container containing these compositions is actuated, it delivers a stream of droplets suitable for covering a surface.

EXAMPLE 15

An insecticide for spraying on walls to control insects in dwellings:

| | Percent |
|---|---|
| Micronized methoxychlor | 1 |
| Micronized DDT | 2.5 |
| 20% pyrethrum extract | 0.5 |
| Sorbitan monooleate | 0.3 |
| Hydroxyethylcellulose (Cellosize QP 15,000) | 0.1 |
| Normal pentane | 0.9 |
| Fresh water | 74.7 |
| Isobutane | 20 |

EXAMPLE 16

Insecticide for spraying on walls to control insects in dwellings:

| | Percent |
|---|---|
| Micronized methoxychlor | 2 |
| Micronized DDT | 3 |
| Sorbitan monolaurate | 0.25 |
| Sorbitan trioleate | 0.05 |
| Carragheenate (Viscarine L) | 0.2 |
| Perfume | 0.3 |
| Hexane | 1.2 |
| Fresh water | 73 |
| Industrial butane | 20 |

EXAMPLE 17

Insecticide for spraying on walls to control insects in dwellings:

| | Percent |
|---|---|
| Micronized dieldrin | 3 |
| Sorbitan monooleate | 0.2 |
| Hydroxyethylcellulose, 25,000 cps. (Natrosol 250H) | 0.1 |
| Perfume | 0.1 |
| Petroleum ether | 1 |
| Fresh water | 78.6 |
| Industrial butane | 17 |

EXAMPLE 18

Aerosol moth killer for spraying on clothing:

| | Percent |
|---|---|
| Micronized methoxychlor | 0.5 |
| Micronized paradichlorobenzene | 10 |
| Sorbitan monooleate | 0.5 |
| Medium-viscosity CMC (Blanose R110) | 0.5 |
| De-odorized kerosene | 1.4 |
| Lavender oil | 0.1 |
| Fresh water | 67 |
| Industrial butane | 20 |

EXAMPLE 19

Aerosol product for the pest control of dogs:

| | Percent |
|---|---|
| Micronized DDT | 3 |
| Sorbitan monooleate | 0.2 |
| Alginate | 0.2 |
| Normal pentane | 0.8 |
| Fresh water | 80.8 |
| Isobutane | 15 |

EXAMPLE 20

Aerosol product for the control of cockroaches in dwellings:

| | Percent |
|---|---|
| Micronized phenothiazine | 2 |
| Sorbitan monolaurate | 0.2 |
| Hydroxyethylcellulose (Cellosize WP 4,000) | 0.3 |
| De-odorized kerosene | 0.7 |
| Fresh water | 82.8 |
| Industrial butane | 14 |

In Examples 15 to 20 the composition contains an excess of hydrocarbon in relation to the optimum quantity for stabilization of the solid particles in suspension, as in Examples 1 to 10. This liquid hydrocarbon excess is admitted directly in vapor phase into the valve during its opening to improve spraying.

The action or actions of each of the constituents in Examples 15 to 20 are shown in Table III with the same symbols as used in Table I.

*Table III*

| Constituents | Examples | | | | | |
|---|---|---|---|---|---|---|
| | 15 | 16 | 17 | 18 | 19 | 20 |
| Methoxychlor | AS | AS | | AS | | |
| DDT | AS | AS | | | AS | |
| Dieldrin | | | AS | | | |
| Paradichlorobenzene | | | | AS | | |
| Phenothiazine | | | | | | AS |
| Pyrethrum extract | A | | | | | |
| Sorbitan monooleate | T | | T | T | T | |
| Sorbitan monolaurate | | T | | | | T |
| Sorbitan Trioleate | | T | | | | |
| Hydroxyethylcellulose | C | | C | | | C |
| Carragheenate | | C | | | | |
| CMC | | | | C | | |
| Alginate | | | | | C | |
| Perfume | | Z | Z | Z | | |
| Pentane | H | | | | H | |
| Hexane | | H | | | | |
| Petroleum ether | | | H | | | |
| Kerosene | | | | H | | H |
| Butane or isobutane | HP | HP | HP | HP | HP | HP |

Since all the compositions 15 to 20 containing a hydrocarbon liquid under room pressure and ambient temperature permit the intermediate production of a stable concentrated suspension, the preferred industrial method of manufacture is as already described in Examples 1 to 10.

The stable suspensions according to the invention therefore have numerous industrial applications. The invention is naturally not limited to the above exemplified formulae and the proportions used in these examples may be adapted to the conditions of use. Thus, the composition may have more than the five required constituents without departing from the scope of the invention.

It may in particular contain a plurality of hydrophobic substances (Examples 3, 4, 5, 6, 7, 11, 15, 16 and 18), a plurality of soluble colloids (Example 12), a plurality of surface-active agents (Examples 2, 3, 8, 11, 16), a plurality of liquid hydrocarbons (Examples 1 to 9 and 15 to 20) and in certain proportions all the ingredients required for the activity, preparation, distribution, packing and conservation of the final product. These ingredients may be liquids miscible with water (acetone in Example 6), liquids miscible with the hydrocarbons (pyrethrins in Example 6 and perfume in Examples 16, 17 and 18), solids soluble in water (urea in Example 6), solids soluble in the hydrocarbon (dimetan in Examples 5, 6 and 7), and also pulverulent products insoluble in water and hydrocarbons but of a hydrophilic character (oxychloride in Example 2 and zineb in Example 8).

What I claim is:

1. A pesticidally active composition adapted to be stored under pressure in an aerosol dispenser, said composition consisting essentially of (I) a suspension, in a primarily aqueous medium, of particles of solid agent of sizes less than 50 microns, at least a substantial portion of said solid agent being pesticidally active, at least about 45% by weight of said solid agent consisting of hydrophobic solid selected from the class consisting of aluminium, sulfur and organic compounds which are in the solid state at room temperature, are inert to water and are of hydrophobic nature, and from 0 to at most about 55% by weight of said solid agent consisting of pesticidally active hydrophilic substance, said solid agent being present in said composition in an amount of from about 0.2 to about 20% by weight calculated on the weight of said composition, and (II) suspension-stabilizing adjuvant combination consisting essentially of (a) hydrophilic polysaccharide colloid soluble in cold water, the amount of said colloid being such that the viscosity of the mixture of colloid and water present in the composition is between about 1.5 and 6 centipoises at room temperature;

(b) surface-active agent, which is liquid at room temperature, is capable of giving a water-in-oil type emulsion and which is a member selected from the group consisting of (i) a monoester of a fatty acid and an alkanepolyol the molecular weights of the alcohol and acid moieties and the number of hydroxyl and ether groups of which are such that the HLB number of the ester is at least 4 and below 9, (ii) a diester of a fatty acid and an alkanepolyol the molecular weights of the alcohol and acid moieties and the number of hydroxyl and ether groups of which are such that the HLB number of the diester is at least 3 and below 9, and (iii) a triester of a fatty acid and an alkanepolyol the molecular weights of the alcohol and acid moieties and the number of hydroxyl and ether groups of which are such that the HLB number of the triester is at least 2 and below 9, the amount of said surface-active agent being at least about one twentieth of the amount of said hydrophobic portion of solid particles and higher depending on the mean particle size of the latter, and (c) hydrocarbon selected from the group consisting of those saturated and unsaturated aliphatic and cycloaliphatic hydrocarbons of from 3 to 15 carbon atoms, which hydrocarbon is liquid at room temperature and under the pressure prevailing in said aerosol dispenser, the amount of said hydrocarbon being at least about the sum of 5% by weight calculated on the weight of the hydrophobic portion of said solid agent plus 2.5 times the decadic logarithm of the last mentioned weight, said hydrocarbon evaporating at room temperature when the pressure in said dispenser is released; said hydrophobic portion of said solid agent being substantially insoluble in said hydrocarbon, the balance of said composition consisting essentially of water, amounting to at least about 60% of the total weight of the composition.

2. A pesticidally active composition as defined in claim 1, wherein said solid agent consists substantially entirely of pesticidally active hydrophobic solid.

3. A pesticidally active composition as described in claim 1, wherein said hydrophilic polysaccharide colloid is carboxymethylcellulose.

4. A pesticidally active composition as described in claim 1, wherein said hydrophilic polysaccharide colloid is agar-agar.

5. A pesticidally active composition as described in claim 1, wherein said hydrophilic polysaccharide colloid is gum arabic.

6. A pesticidally active composition as described in claim 1, wherein said hydrophilic polysaccharide colloid is gum tragacanth.

7. A pesticidally active composition as described in claim 1, wherein said hydrophilic polysacchride colloid is cold water-soluble alginate.

8. A pesticidally active composition as described in claim 1, wherein said hydrophilic polysaccharide colloid is cold water-soluble carragheenate.

9. A pesticidally active composition as described in claim 1, wherein said hydrophilic polysaccharide colloid is cold water-soluble hydroxycellulose.

10. A pesticidally active composition as described in claim 1, wherein said surface-active agent is sorbitan monooleate.

11. A pesticidally active composition as described in claim 1, wherein said hydrocarbon is isobutane.

12. A pesticidally active composition as described in claim 1, wherein said hydrocarbon is butane.

13. A pesticidally active composition as described in claim 1, in which said hydrocarbon is present in an amount substantially in excess of said sum, said excess being sufficient to expel substantially the entire content of said dispenser.

14. A pesticidally active composition according to claim 1 wherein the pesticidally active substance is constituted by particles of a hydrophilic solid, said composition further comprising hydrophobic solid particles free from pesticidal activity.

References Cited by the Examiner

UNITED STATES PATENTS

| | | | |
|---|---|---|---|
| 3,037,854 | 6/1962 | Kenney | 71—2.1 |

FOREIGN PATENTS

| | | |
|---|---|---|
| 630,513 | 11/1961 | Canada. |
| 630,023 | 10/1949 | Great Britain. |
| 630,090 | 10/1949 | Great Britain. |
| 815,510 | 6/1959 | Great Britain. |
| 851,250 | 10/1960 | Great Britain. |

LEWIS GOTTS, *Primary Examiner.*

JULIAN S. LEVITT, *Examiner.*

JAMES O. THOMAS, Jr., *Assistant Examiner.*